US012057094B2

(12) United States Patent
(10) Patent No.: US 12,057,094 B2
(45) Date of Patent: Aug. 6, 2024

Dunwoodie et al.

(54) TUNING MACHINE FOR STRINGED INSTRUMENTS

(71) Applicant: David Dunwoodie, Delta (CA)

(72) Inventors: David Dunwoodie, Delta (CA); Oliver Johann Pirquet, Victoria (CA)

( * ) Notice: Subject to any disclaimer, the term of this patent is extended or adjusted under 35 U.S.C. 154(b) by 0 days.

(21) Appl. No.: 17/290,251

(22) PCT Filed: Oct. 30, 2019

(86) PCT No.: PCT/CA2019/051537

§ 371 (c)(1),
(2) Date: Apr. 29, 2021

(87) PCT Pub. No.: WO2020/087168

PCT Pub. Date: May 7, 2020

(65) Prior Publication Data

US 2022/0020343 A1 Jan. 20, 2022

Related U.S. Application Data

(60) Provisional application No. 62/753,673, filed on Oct. 31, 2018.

(51) Int. Cl.
*G10D 3/14* (2020.01)

(52) U.S. Cl.
CPC .................................... *G10D 3/14* (2013.01)

(58) Field of Classification Search
CPC .. G10D 3/14; G10D 1/08; G10D 1/10; G10D 1/00; G10D 3/00
See application file for complete search history.

(56) References Cited

U.S. PATENT DOCUMENTS 1,710,802 A 4/1929 Page
8,859,868 B2 10/2014 Dunwoodie
(Continued)

FOREIGN PATENT DOCUMENTS

WO WO 2018201234 11/2018

*Primary Examiner* — Kimberly R Lockett

(57) ABSTRACT

A tuning machine for a stringed instrument comprising: an input shaft having a first end, and an opposite second end having an eccentric, the input shaft being rotatable in response to an input from a user; a gear member or rotor with a central axial bore to receive the eccentric to move the rotor though a circular motion as the input shaft rotates, the rotor having a first or upper gear portion with external first lobes, and a second or lower gear portion with external second lobes; a first or upper ring gear having internal first teeth positioned around the first lobes of the first gear portion; a second or lower ring gear separate from the upper ring gear and having internal second teeth positioned around the second lobes, said upper and lower ring gears being larger than the rotor to accommodate the circular motion of the rotor within said ring gears such that at least one of the first lobes meshes with at least one of the internal first teeth, and at least one of the second lobes meshes with and drives at least one of the internal second teeth of the lower ring gear as the rotor moves through its circular motion to rotate the lower ring gear about its central axis; and a string post driven by the lower ring gear to wind a string of the instrument as a result of rotation of the input shaft in one direction and unwind the string as a result of rotation of the input shaft in an opposite direction.

16 Claims, 4 Drawing Sheets

(56) References Cited

U.S. PATENT DOCUMENTS

| | | | | |
|---|---|---|---|---|
| 2002/0026864 | A1 | 3/2002 | Gotoh | |
| 2016/0118027 | A1* | 4/2016 | Eyman | G10D 3/14 84/293 |
| 2017/0365239 | A1* | 12/2017 | Peterson | G10D 3/04 |

* cited by examiner

TUNING MACHINE FOR STRINGED INSTRUMENTS

BACKGROUND OF THE INVENTION

Field of Invention

This invention relates to a machine head or tuning machine for tuning stringed musical instruments, particularly to a tuning machine for ukuleles, guitars, banjos, or similar stringed instruments.

Description of Related Art

Stringed musical instruments typically provide a fixed anchor on one end of each string and a mechanism on the other end which allows a user to establish a select amount of tension in the string. The frequency at which the string oscillates depends greatly on, among several other parameters, the vibrating length of the string and its tension. A geared mechanical mechanism used to adjust the tension of the string is often referred to as a tuning machine or machine head. Tuning machines are well known in the art, and a typical tuning machine used on guitars, banjos and the like comprise a tuning handle secured to an end of a worm shaft which extends through a housing. A worm wheel is meshed with the worm shaft inside the housing, and a cylindrical post is connected to the worm wheel and aligned with the rotational axis of the worm wheel. The cylindrical post extends through a hole in the headstock of the instrument to the same side as the strings and is aligned such that its axis is generally perpendicular to the strings. In operation, as the handle (hence worm shaft) is rotated, it rotates the worm wheel, hence the cylindrical post. By this a guitar string that is inserted through a guitar string insertion hole defined in the cylindrical post is wound or unwound on or from the cylindrical post, thereby increasing or decreasing the string tension to effect tuning of the string.

There are numerous commercially available tuning machines of various designs, but most have the above common features and functions, and most are manufactured of primarily of metal. A drawback of many of conventional geared tuning machines is that the gear ratio is somewhat limited by the size of the teeth in the gears. Typically, a gear reduction of 36:1 is the limit for conventional tuning machines since the teeth become too fine and are easily damaged. Accordingly, there is a need for a simple, light weight and cost-effective tuning machine with embodiments that can be used on small or large stringed instruments without adding a lot of weight to the headstock, that can provide a wide range of gear reduction ratios, including high gear reduction ratios of 36:1 or more, and that can be economically mass produced at low cost.

SUMMARY OF THE INVENTION

Accordingly, in some embodiments, the present invention provides a tuning machine for a stringed instrument comprising: an input shaft having a first end, and an opposite second end having an eccentric, the input shaft being rotatable in response to an input from a user; a gear member or rotor with a central axial bore to receive the eccentric to move the rotor though a circular motion as the input shaft rotates, the rotor having a first or upper gear portion with external first lobes, and a second or lower gear portion with external second lobes; a first or upper ring gear having internal first teeth positioned around the first lobes of the upper gear portion; a second or lower ring gear separate from the upper ring gear and having internal second teeth positioned around the second lobes of the lower gear portion, said upper and lower ring gears being larger than the rotor to accommodate the circular motion of the rotor within said ring gears such that at least one of the first lobes meshes with at least one of the internal first teeth, and at least one of the second lobes meshes with and drives at least one of the internal second teeth of the lower ring gear as the rotor moves through its circular motion to rotate the lower ring gear about its central axis; and a string post driven by the lower ring gear to wind a string of the instrument as a result of rotation of the input shaft in one direction and unwind the string as a result of rotation of the input shaft in an opposite direction.

In some embodiments, the first and second lobes may be convex and capable of meshing respectively with complementarily concave grooves between the first internal teeth and the second internal teeth.

In some embodiments, the rotor may have at least one fewer lobe than the internal teeth of the corresponding ring gear.

In some embodiments, the rotor may have one or two fewer lobes than the internal teeth of the corresponding ring gear.

In some embodiments, the string post may be connected to the lower ring gear coaxially with the central axis of the lower ring gear.

In some embodiments, the apparatus may further comprise a housing for mounting on the stringed instrument, the housing defining a bore and the input shaft being journaled for rotation in the bore, and the housing further defining a cavity to accommodate the rotor and upon which the upper ring gear is mounted.

In some embodiments, the housing may include a base portion having a bottom surface for mounting on the stringed instrument, wherein the cavity may be defined in the base portion and may be open to the bottom surface, the housing may further include a top wall opposite the bottom surface that delimits the cavity, and wherein the bore is defined in the top wall and the upper ring gear is defined in an inside surface of the top wall.

In some embodiments, the apparatus may further include a handle connected to the first end of the input shaft to facilitate a user to impart rotation to the input shaft.

Other aspects and features of the present invention will become apparent to those of ordinary skill in the art upon review of the following description of embodiments of the invention in conjunction with the accompanying figures and claims.

BRIEF DESCRIPTION OF THE DRAWINGS

The drawings constitute a part of this specification and include a preferred embodiment of the invention, which may be achieved in various forms. It is to be understood that in some instances various aspects of the invention may be shown exaggerated or enlarged to facilitate an understanding of the invention. In the drawings.

DETAILED DESCRIPTION

Figure 1:
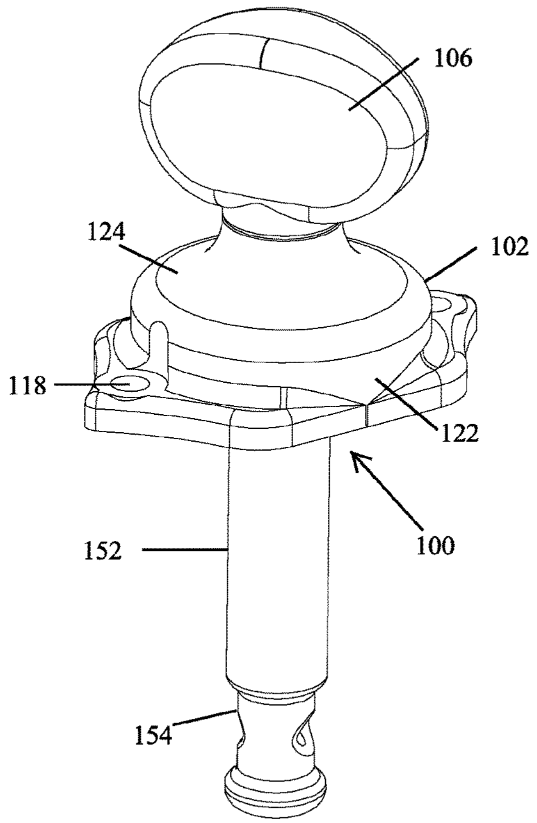
FIG. 1 is a perspective view of a tuning machine in accordance with an embodiment of the present invention.
Figure 2:
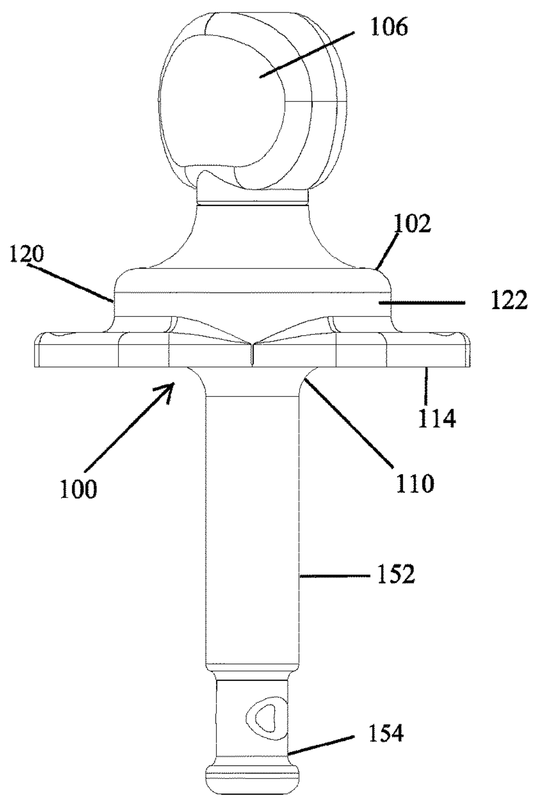
FIG. 2 is a side view of the tuning machine of FIG. 1.
Figure 3:
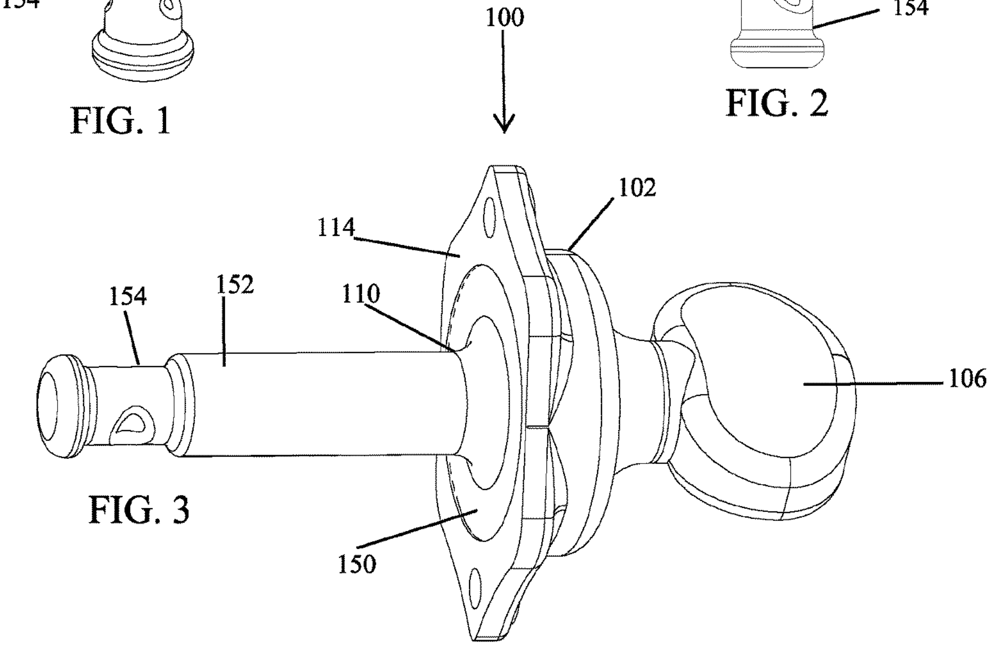
FIG. 3 is another perspective view of the tuning machine of FIG. 1.

For the purposes of promoting an understanding of the principles of the invention reference will now be made to the exemplary embodiment illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one, skilled in the relevant art and having possession of this disclosure, are to be considered within the scope of the invention.

Referring to FIGS. 1-10, there is shown a machine head or tuning machine 100 in accordance with a first embodiment of the present invention that can be mounted on the headstock of a stringed instrument, such as for example a guitar, banjo, ukulele, and the like. Tuning machine 100 comprises housing 102, input shaft 104, handle 106, gear member or rotor 108 and output member 110.

Housing 102 includes a base portion 114 having a flat surface 116 adapted to abut a flat surface on the headstock of stringed instrument. Base portion 114 includes one or more mounting holes 118 to receive fasteners such as screws for affixing the housing 102 to the headstock. Housing 102 further includes a raised portion 120 having circumferential sidewall 122 and top wall 124 that together define an internal cavity such as circular cavity 126. The top wall 124 includes central bore 128 that is coaxial with the cavity 126.

Input shaft 104 has a first end 138 and an opposite second end 136 having an eccentric 134. It should be understood by the reader that an eccentric is a circular disk or pin fixed to a rotating axle with its centre 135 offset from the centre 137 of the axle. At the first end 138 the input shaft 104 is connected to handle 106 by being shaped to be received within a generally rectangular axial bore 140 that passes through the handle 106 so that the handle 106 and the end 138 of the input shaft 104 can be said to have a key fit. The end 136 of the input shaft is journaled for rotation within the central bore 128 of the housing 102 in a manner that the eccentric 134 extends into the cavity 126. Accordingly, turning handle 106 rotates the eccentric 134 within cavity 126. In this manner, the input shaft is rotatable in response to an input from a user; however, other user input mechanisms for rotating the input shaft will henceforth be apparent to the skilled reader.

Figure 8:
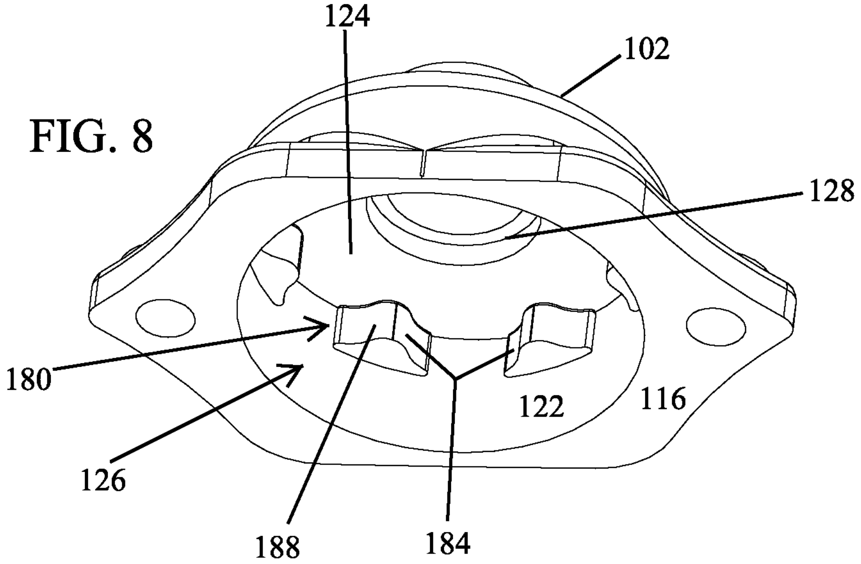
FIG. 8 is a perspective view from the bottom of the housing showing the upper ring gear.
Figure 9:
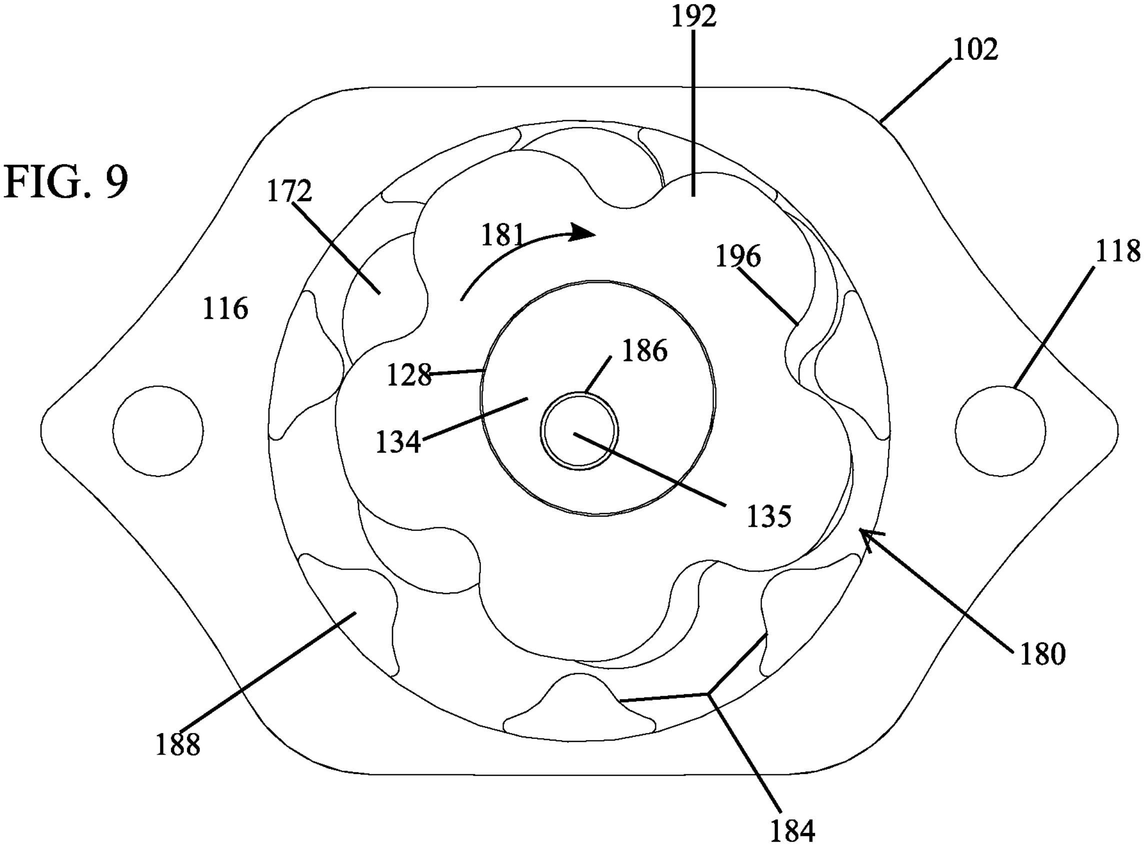
FIG. 9 is a view of the housing from the bottom showing the upper ring gear and the rotor.

Referring to FIGS. 8 and 9, within the cavity 126 of the housing 102 is defined an internal ring gear such as upper ring gear portion 180 comprises a plurality of teeth 188 evenly spaced around the circumference of the cavity 126 that define semicircular grooves 184 therebetween located radially about a center 186, which coincides with the longitudinal axis 137 of input shaft 104. The teeth 188 are preferably rounded. Accordingly, the cavity 126, the upper ring gear portion 180 with the grooves 184 and teeth 188 are an embodiment of a first ring gear having internal teeth.

Tuning machine 100 further includes a second ring gear such as lower ring gear portion 160. In the illustrated embodiment, the lower ring gear portion 160 is part of output member 110 that comprises disc portion 150. Together, the disc portion 150 and the housing 102 are preferably shaped and configured such that the disc portion 150 is received within the internal cavity 126. The output member 110 further comprises an output shaft 152 perpendicular to the disc portion 150 that functions as a string post and includes a string winding portion 154 upon which an end of a string of the instrument is wound. Accordingly, the string post 150 is driven by the lower ring gear portion 160 in the illustrated embodiment by being directly connected to the lower ring gear portion 160. However, in some embodiments the string post may be indirectly coupled to the lower ring gear, such as for example by intermediate gears, so as to be driven by the ring gear.

Figure 4:
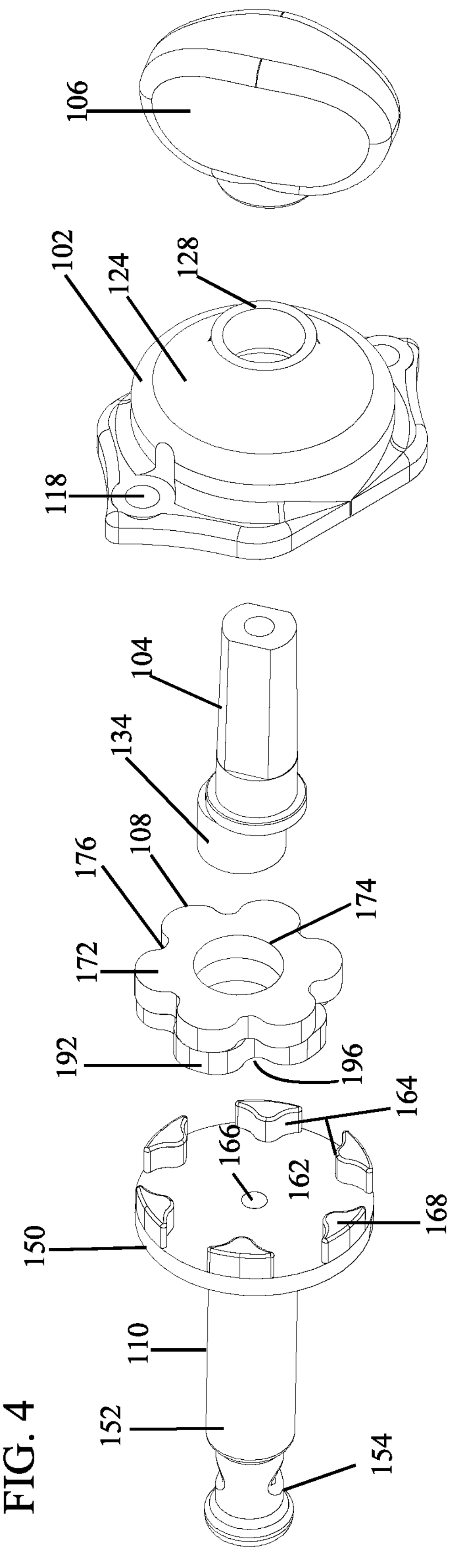
FIG. 4 is an exploded perspective view from the top of the tuning machine of FIG. 1.
Figure 5:
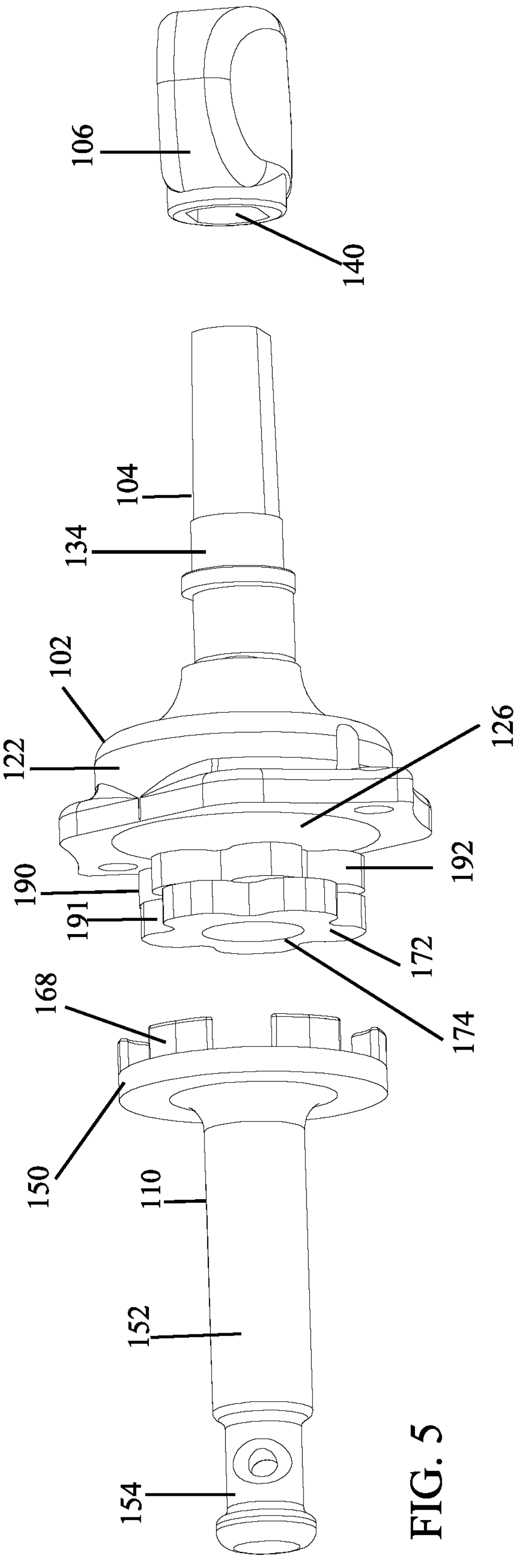
FIG. 5 is an exploded perspective view from the side of the tuning machine of FIG. 1.
Figure 6:
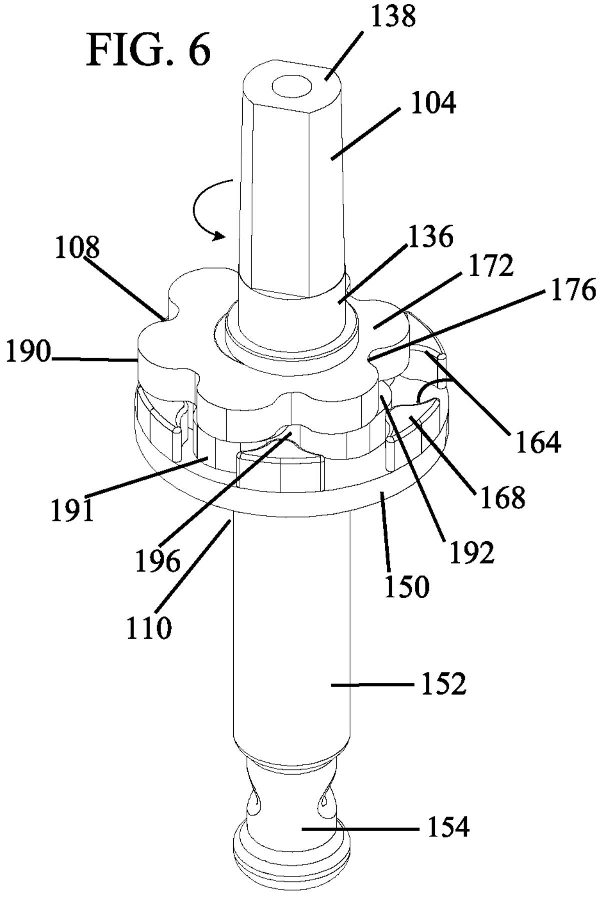
FIG. 6 is a perspective view of the tuning machine of FIG. 1 without the handle and housing showing the input shaft, rotor, lower ring gear and output shaft.
Figure 7:
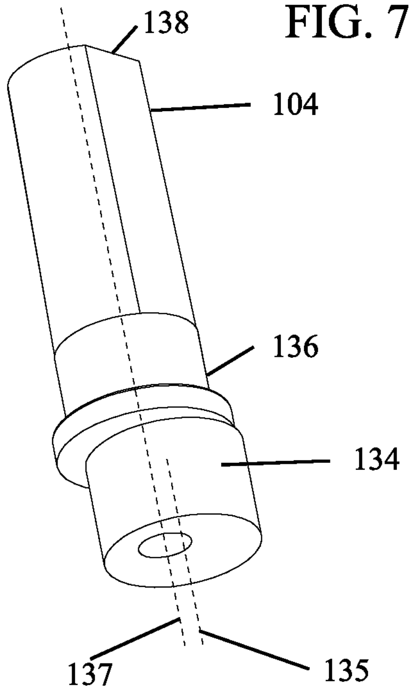
FIG. 7 is a close-up perspective view of the eccentric on the input shaft.
Figure 10:
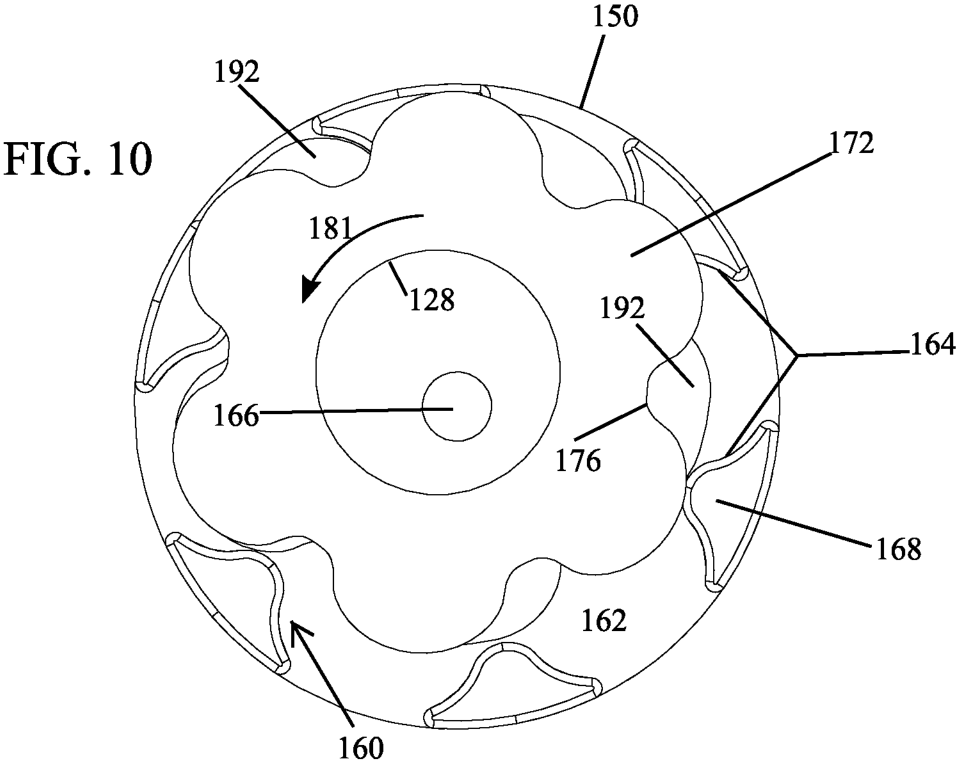
FIG. 10 is a view of the output member from the top showing the lower ring gear and the rotor therein.

Referring to FIGS. 4, 6 and 10, disc portion 150 defines internal planar surface 162 on which are provided a plurality of teeth 168 evenly spaced around the circumference of the disc portion that define semicircular grooves 164 therebetween located radially about a center 166, which coincides with the longitudinal axis of output shaft 152. The teeth 168 between adjacent semicircular grooves 164 are rounded. Accordingly, the disc portion 150, the lower ring gear portion 160 with the grooves 164 and teeth 168 are embodiments of a second ring gear having internal teeth.

With tuning machine 100 mounted on the headstock of the instrument, the output shaft 152 of the output member 110 passes through an opening in the headstock as is common in the art, and the disc portion 150 is received within the internal cavity 126 of the housing 102. The housing is fastened to the headstock such that the disc portion 150 is rotatable within the internal cavity 126.

Rotor 108 comprises two stacked disc-like gear portions that are connected: upper gear portion 190 and lower gear portion 191. Rotor 108 has a central axial bore 174 passing therethrough that receives the eccentric 134 of input shaft 104. The upper gear portion 190 defines a circumferential edge having a plurality of semicircular lobes 172 located radially about central axial bore 174. The transition zone or semicircular groove 176 between adjacent lobes 172 is concave. The upper gear portion 190 is configured to fit within the upper ring gear portion 180 of the housing 102 in an assembled tuning machine. The lower gear portion 191 defines a circumferential edge having a plurality of semicircular lobes 192 located radially about central axial bore 174. The transition zone or semicircular groove 196 between adjacent lobes 192 is concave. The lower gear portion 191 is configured to fit within the lower ring gear portion 160 of the output member 110 in an assembled tuning machine.

The lobes 172 of the rotor are sized and shaped to mesh with the grooves 184 of the upper ring gear portion 180, as shown in FIG. 9. Accordingly, the upper ring gear 180 is larger than the upper gear 190 to accommodate the eccentric circular motion of the upper gear 190 within the upper ring gear such that at least one of the lobes 172 meshes with at least one of the internal teeth 188 of the ring gear as the rotor 108 is driven through its eccentric circular motion as a result of rotation of the eccentric 134 about the central axis 137 of the input shaft 104. The number of lobes 172 on the upper gear portion 190 is at least one less, and may be two less, than the number of semicircular grooves 184 on the upper ring gear portion 180. As will be explained herein, the number of lobes 172 determines the gear reduction ratio from the input shaft 104 to the rotor 108.

The lobes 192 of the rotor are sized and shaped to mesh with the grooves 164 of the lower ring gear portion 160, as shown in FIG. 10. Accordingly, the lower ring gear 160 is larger than the lower gear 191 to accommodate the eccentric circular motion of the lower gear 191 within the lower ring gear 160 such that at least one of the lobes 192 meshes with at least one of the internal teeth 168 of the ring gear as the rotor 108 is driven through its eccentric circular motion as a result of rotation of the eccentric 134 about the central axis 137 of the input shaft 104. The number of lobes 192 on the lower gear portion 191 is at least one less, and may be two less, than the number of semicircular grooves 164 on the lower ring gear portion 160. As will be explained herein, the number of semicircular grooves 164 determines the gear reduction ratio from the rotor 108 to the output shaft 152.

In the illustrated embodiment, the upper ring gear portion 180 has seven semicircular grooves 184 and the upper gear portion 190 of the rotor 108 has six semicircular lobes 172. Accordingly, the upper gear portion has at least one fewer lobes 172 than the grooves 184, and consequently the teeth 188 of the upper ring gear portion. Preferably the upper gear portion has one or two fewer lobes 172 than the teeth 188 of the upper ring gear 180. Preferably the upper gear portion has one fewer lobe 172 than the teeth 188 of the upper ring gear portion.

In the illustrated embodiment, the lower ring gear portion 160 has six semicircular grooves 164, and consequently six teeth 168, and the lower gear portion 191 of the rotor 108 has five semicircular lobes 192. Accordingly, the lower gear portion has at least one fewer lobe 192 than the grooves 164/teeth 168 of the lower ring gear portion. Preferably the lower gear portion has one or two fewer lobes 192 than the teeth 168 of the lower ring gear. Preferably the lower gear portion has one fewer lobe 192 than the teeth 168 of the lower ring gear portion.

In the assembled tuning machine 100, the rotor 108 and the disc portion 150 are received within the internal cavity 126 of the housing 102, which is mounted onto the head-stock of the stringed instrument. Hence the rotor 108 is sandwiched between the disc portion 150 and the upper wall 124 in a manner that the lobes 192 of the lower gear 191 mesh with the grooves 164 of the lower ring gear 160, and the lobes 192 of the upper gear 190 mesh with the grooves 184 of the upper ring gear 180. The disc 150 is free to rotated within the housing 102, and in turn is connected to the output shaft 152. The central bore 174 of the rotor 108 receives the eccentric 134 of the input shaft 104, which is journaled to rotate within bore 128 of the housing at end 136 and is connected to the handle 106 at end 138. Accordingly, in the assembled tuning machine 100, rotation of the input shaft 104 via handle 106, or by any other mechanism, causes rotation of the eccentric 134 about the longitudinal axis 137 of the input shaft, which drives the rotor 108 to move in a planar eccentric circular manner within the cavity 126.

Referring to FIG. 9, which is a view from the bottom, there is shown the rotor 108 within the cavity 126 of the housing. The rotor 108 is driven by eccentric 134 via central bore 174 such that the rotor moves in an eccentric circle. This causes one or more of the lobes 172 on the upper gear 190 to abut against adjacent teeth 188 of the upper ring gear 180 and thereby impart rotation to the rotor 108 through an arc of rotation, such as for example in direction 181, with each successive engagement between the lobes 172 and the teeth 188/grooves 184. Direction 181 is opposite the direction of revolution of the input shaft/eccentric. The result is a first gear reduction from the input shaft to the rotor since one revolution of the input shaft (hence eccentric) results in only a partial revolution of the rotor. It should be noted that the rotor rotates about its central bore 174 as a result of the successive engagements between the lobes 172 and teeth 188/grooves 184, and it also moves in an eccentric circular motion as a result of being driven by the eccentric 134.

Referring to FIG. 10, which is a view from the top, there is shown the rotor 108 on top of the disc member 150 of the output member 110. As the rotor 108 rotates in direction 181 (as described above) and moves in its eccentric circular motion, one or more lobes 192 on the lower gear 191 are driven against one or more adjacent teeth 168 of the lower ring gear 160 on the disc member 150, thereby imparting rotation to the disc member 150 (hence output shaft) through an arc of rotation, in a direction opposite of direction 181, with each successive engagement between the lobes 192 and the teeth 168/grooves 164. The result is a second gear reduction from the rotor 108 to the disc member 150 (hence output shaft) since one revolution of the rotor results in only a partial rotation of the disc member 150. The overall gear reduction from the input shaft 104 to the output shaft 152 is a multiple of the gear reductions from the input shaft to the rotor, and from the rotor to the disc member. Advantageously, the direction of revolution of the output shaft 152 (hence string winding portion) is the same as the direction of revolution of the input shaft 104 (hence handle 102). Reversing the rotation of the input shaft reverses the rotation of the output shaft. Accordingly, the string post is driven by the rotor interacting with the upper and lower ring gears to wind a string of the instrument as a result of rotation of the input shaft in one direction and unwind the string as a result of rotation of the input shaft in an opposite direction.

The movement of the rotor 108 through a complete circle of motion causes the rotation of rotor 108 through an arc of rotation, the value of which depends on the gear ratio and is determined by the number of lobes 172 on the upper gear portion. For example, in the illustrated embodiment in which the upper gear has six lobes 172, the rotation of the rotor 108 that results from a complete circular movement of rotor would be ⅙ of a complete revolution of the rotor. Hence the gear ratio of the input shaft to rotor in such an embodiment would be 6:1, meaning that six complete revolutions of the high-speed input shaft are required to produce one complete revolution of the rotor 108.

The movement of the rotor 108 through a complete circle of motion causes the rotation of the disc member 150 through an arc of rotation, the value of which depends on the gear ratio and is determined by the number of grooves 164/teeth 168 on the lower ring gear 160. For example, in the illustrated embodiment in which the lower ring gear has six grooves 164/teeth 168, the rotation of the disc member 150 that results from a complete circular movement of the rotor would be ⅙ of a complete revolution of the rotor. Hence the gear ratio of the rotor to the output shaft in such an embodiment would be 6:1, meaning that six complete revolutions of the rotor are required to produce one complete revolution of the output shaft. Combining these, the overall reduction from the input shaft 104 to the output shaft 152 would be 36:1.

Hence the gear ratio in the illustrated embodiment would be 36:1, meaning that thirty-six complete revolutions of the input shaft are required to produce one complete revolution of the output shaft 152 on which the string of the instrument is to wound. The gear ratio of the tuning machine 100 may be selected by altering the number of lobes 172 on the upper gear portion 190 and/or the number of grooves 164 on the lower ring gear portion 160. For example, a gear ratio of 64:1 may be obtained by providing eight lobes 172 on the upper gear portion 190 (hence preferably nine grooves 184 on the upper ring gear portion), and eight semicircular grooves 164 on the lower ring gear portion 160 (hence preferably seven lobes 192 on the lower gear portion 191). Similarly, a gear ratio of L×G:1 may be obtained with L number of lobes 172 on the upper gear portion 190 of the rotor 108, with corresponding L+1 grooves 184 on the upper ring gear portion 180, and G number of grooves 164 on the lower ring gear portion 160, with G−1 lobes 192 on the lower gear portion 191 of the rotor.

Preferably the number of lobes 172 and 192 on the rotor is not more than two lobes less than the number of grooves 184 and 164 on the respective upper and lower ring gear portions 180 and 160. The effect of having two less lobes on the rotor than the grooves would result in altering the gear ratios between the respective parts. Also, the effect on the lobes/teeth/grooves interaction would result in greater sliding motion between the rotor and the ring gears, which would tend to reduce the efficiency of the drive as a result of increased friction between the disc and ring gears. Practically it would be difficult to design a rotor with two fewer teeth on a small tuning machine because there would be problems with the meshing of the teeth due to the large difference in diameter, as well as the larger angular displacement of the output drive per tooth engagement.

An advantageous aspect of the tuning machines of the present invention is that the simplicity of the parts makes them highly amenable to being economically mass-produced out of plastic, metal or both by methods such as casting, injection molding, 3D printing techniques or simple machining. As well, the combined gear reduction ratios, from the input shaft to the rotor, and the rotor to the output shaft, enables achieving high gear ratios with relatively crude parts. In contrast, achieving comparatively high gear rations in conventional geared tuning machines necessitates fine gear mechanisms that are more likely to fail. The gear parts in the present invention may have larger variability in dimensions such they may be made to less precise dimensions without impairing function, which makes it possible to manufacture them to less stringent dimensional specifications using economical mass production methods. For example, the parts of the tuning machine of the present invention may be made by injection molding plastics, which results in light weight and cost effective tuning machines that can be used on small stringed instruments (such as ukuleles) or on stringed instruments that typically have large tuning machines (such a bass guitars), and achieve a significant weight reduction in contrast to comparable prior art metal tuning machines. In some embodiments, the tuning machines may include metal portions for structural reinforcement, such as for example a metal rod core in the output shaft/string post, and these can be readily incorporated in a plastic injection molding process. In addition, advantageously the gear mechanism of the present invention cannot be driven by the output shaft. Hence the rotation force caused by string tension on the output shaft does not reverse the gear mechanism to result in unwinding of the string. The gear mechanism may only be driven by the turning of the input shaft by the handle or otherwise. Other benefits of the present invention are that there may be reduced backlash in the gear mechanism, and because of the simplicity in the gear structure, it is quite simple to design tuning machines of a variety of gear ratios from high to low ratios, including gear ratios that are quite high for tuning machines for these kinds of stringed instrument, such as 64:1.

While the above description and illustrations constitute preferred or alternate embodiments of the present invention, it will be appreciated that numerous variations may be made without departing from the scope of the invention. Thus, the embodiments described and illustrated herein should not be considered to limit the invention.

The invention claimed is:

1. A tuning machine for a stringed instrument comprising:

an input shaft having a first end, and an opposite second end having an eccentric, the input shaft being rotatable in response to an input;

a gear member or rotor with a central axial bore to receive the eccentric to move the rotor though a circular motion as the input shaft rotates, the rotor having a first or upper gear portion with external first lobes, and a second or lower gear portion with external second lobes;

a fixed first or upper ring gear having internal first teeth positioned around the first lobes of the first gear portion;

a rotatable second or lower ring gear separate from the upper ring gear and having internal second teeth positioned around the second lobes, said upper and lower ring gears being larger than the rotor to accommodate the circular motion of the rotor within said ring gears such that at least one of the first lobes meshes with at least one of the internal first teeth, and at least one of the second lobes meshes with and drives at least one of the internal second teeth of the lower ring gear as the rotor moves through its circular motion to rotate the lower ring gear about its central axis; and a string post driven by the lower ring gear to wind a string of the instrument as a result of rotation of the input shaft in one direction and unwind the string as a result of rotation of the input shaft in an opposite direction.

2. The apparatus of claim 1, wherein the first and second lobes are convex and capable of meshing respectively with complementarily concave grooves between the internal first teeth and the internal second teeth.

3. The apparatus of claim 1, wherein the rotor has at least one fewer lobe than the internal teeth of the corresponding ring gear.

4. The apparatus of claim 2, wherein the rotor has one or two fewer lobes than the internal teeth of the corresponding ring gear.

5. The apparatus of claim 3, wherein the string post is connected to the lower ring gear coaxially with the central axis of the lower ring gear.

6. The apparatus of claim 5, further comprising a housing for mounting on the stringed instrument, the housing defining a bore and the input shaft being journaled for rotation in the bore, and the housing further defining a cavity to accommodate the rotor and upon which the upper ring gear is mounted.

7. The apparatus of claim 6, wherein the housing includes a base portion having a bottom surface for mounting on the stringed instrument, wherein the cavity is defined in the base portion and is open to the bottom surface, the housing further includes a top wall opposite the bottom surface that delimits the cavity, and wherein the bore is defined in the top wall and the upper ring gear is defined in an inside surface of the top wall.

8. The apparatus of claim 7, wherein the apparatus further includes a handle connected to the first end of the input shaft to facilitate a user to impart rotation to the input shaft.

9. The apparatus of claim 2, wherein the string post is connected to the lower ring gear coaxially with the central axis of the lower ring gear.

10. The apparatus of claim 9, further comprising a housing for mounting on the stringed instrument, the housing defining a bore and the input shaft being journaled for rotation in the bore, and the housing further defining a cavity to accommodate the rotor and upon which the upper ring gear is mounted.

11. The apparatus of claim 10, wherein the housing includes a base portion having a bottom surface for mounting on the stringed instrument, wherein the cavity is defined in the base portion and is open to the bottom surface, the housing further includes a top wall opposite the bottom surface that delimits the cavity, and wherein the bore is defined in the top wall and the upper ring gear is defined in an inside surface of the top wall.

12. The apparatus of claim 11, wherein the apparatus further includes a handle connected to the first end of the input shaft to facilitate a user to impart rotation to the input shaft.

13. The apparatus of claim 1, wherein the string post is connected to the lower ring gear coaxially with the central axis of the lower ring gear.

14. The apparatus of claim 13, further comprising a housing for mounting on the stringed instrument, the housing defining a bore and the input shaft being journaled for rotation in the bore, and the housing further defining a cavity to accommodate the rotor and upon which the upper ring gear is mounted.

15. The apparatus of claim 14, wherein the housing includes a base portion having a bottom surface for mounting on the stringed instrument, wherein the cavity is defined in the base portion and is open to the bottom surface, the housing further includes a top wall opposite the bottom surface that delimits the cavity, and wherein the bore is defined in the top wall and the upper ring gear is defined in an inside surface of the top wall.

16. The apparatus of claim 15, wherein the apparatus further includes a handle connected to the first end of the input shaft to facilitate a user to impart rotation to the input shaft.

* * * * *